United States Patent
Paget et al.

(10) Patent No.: US 12,291,346 B2
(45) Date of Patent: May 6, 2025

(54) PROPULSION SYSTEM FOR AN AIRCRAFT AND METHOD FOR PROTECTING THE PROPULSION SYSTEM

(71) Applicants: Airbus SAS, Blagnac (FR); Airbus Operations SAS, Toulouse (FR)

(72) Inventors: Darren Paget, Toulouse (FR); Vincent Lamonzie, Toulouse (FR); Norberto Simionato Neto, Taufkirchen (DE)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 114 days.

(21) Appl. No.: 18/182,899

(22) Filed: Mar. 13, 2023

(65) Prior Publication Data
US 2023/0294836 A1 Sep. 21, 2023

(30) Foreign Application Priority Data
Mar. 18, 2022 (FR) ...................................... 2202410

(51) Int. Cl.
*B64D 33/10* (2006.01)
*B64D 27/24* (2006.01)

(52) U.S. Cl.
CPC ............. *B64D 33/10* (2013.01); *B64D 27/24* (2013.01)

(58) Field of Classification Search
CPC . B64D 33/10; F02C 7/141; F02C 7/18; F02C 7/185; F05D 2260/602; F05D 2260/6022
See application file for complete search history.

(56) References Cited

U.S. PATENT DOCUMENTS

| | | | |
|---|---|---|---|
| 8,192,882 B2* | 6/2012 | Stolte | B64D 41/00 429/434 |
| 11,015,828 B2 | 5/2021 | Sakae | |
| 11,394,063 B2* | 7/2022 | Bae | H01M 10/625 |
| 11,485,192 B2* | 11/2022 | Bruneau | H01M 10/6557 |
| 2012/0297809 A1* | 11/2012 | Carpenter | B60L 58/26 62/239 |
| 2012/0318368 A1 | 12/2012 | Doughty et al. | |
| 2016/0129756 A1* | 5/2016 | Enomoto | F25B 25/005 62/244 |
| 2017/0158081 A1* | 6/2017 | Kim | H01M 10/6568 |
| 2019/0226705 A1* | 7/2019 | Sakae | F25B 49/02 |
| 2020/0386648 A1* | 12/2020 | Luccini | G01M 3/243 |

FOREIGN PATENT DOCUMENTS

| | | | |
|---|---|---|---|
| CN | 109698604 A | * | 4/2019 |
| EP | 2538193 A1 | | 12/2012 |

OTHER PUBLICATIONS

French Search Report for French Patent Application No. 2202410 dated Oct. 17, 2022; priority document.

* cited by examiner

*Primary Examiner* — Thuyhang N Nguyen
(74) *Attorney, Agent, or Firm* — Greer, Burns & Crain, Ltd.

(57) ABSTRACT

A propulsion system for an aircraft comprises a closed cooling circuit which has at least one main segment and at least two secondary segments, in which a heat-transfer fluid circulates. Each secondary segment has: a leak detection device, a shut-off valve, and a non-return valve. The cooling circuit also has electronic circuitry configured to close the shut-off valve of a secondary segment when a leak is detected by the leak detection device of said secondary segment.

13 Claims, 5 Drawing Sheets

PROPULSION SYSTEM FOR AN AIRCRAFT AND METHOD FOR PROTECTING THE PROPULSION SYSTEM

CROSS-REFERENCES TO RELATED APPLICATIONS

This application claims the benefit of French patent application number 2 202 410 filed on Mar. 18, 2022, the entire disclosure of which is incorporated herein by way of reference.

FIELD OF THE INVENTION

The present invention relates to the field of propulsion systems comprising cooling circuits in an aircraft, and relates more particularly to the protection, in the event of a leak, of the propulsion systems of the aircraft that are cooled by the cooling circuits.

BACKGROUND OF THE INVENTION

Liquid hydrogen is a cryogenic fluid which can be used as an energy source for producing electricity. Thus, for example, it is possible to use a hydrogen fuel cell to power the flight control and communications systems of an aircraft, and for an on-board lighting system and various accessories used on board the aircraft. Liquid hydrogen may also be used as an energy source for the propulsion of the aircraft, by being supplied to a fuel cell or by direct combustion, this affording the advantage that only water is discharged into the atmosphere.

Such a fuel cell generates heat, which needs to be managed in order to maintain or increase the efficiency of the fuel cell. Moreover, it is necessary to manage the heat generated by systems on board the aircraft. A cooling circuit in which a heat-transfer fluid circulates can then be used in the aircraft in order to cool the fuel cells and/or the on-board systems, via heat exchangers.

However, leaks may arise in such a cooling circuit, these having a negative effect on the cooling performance for the fuel cells and/or on-board systems. This may result in the set of elements comprising the fuel cells or on-board systems becoming unavailable.

Consequently, there is a need to improve this situation.

It is desirable to provide a solution which makes it possible to manage a leak that arises in a cooling circuit, while maintaining the functionalities implemented by elements of the aircraft that are cooled by such a cooling circuit. In particular, it is desirable to ensure the availability of a propulsion system of the aircraft in the event of a leak arising in such a cooling circuit when said cooling circuit is used to cool fuel cells powering this propulsion system.

It is thus desirable to provide a solution that is lightweight and easy to install.

SUMMARY OF THE INVENTION

A propulsion system for an aircraft is provided, comprising:
at least two fuel cells,
an electric propulsion motor electrically connected to the fuel cells,
functional elements,
at least two heat exchangers provided to effect heat exchange with ram air, and
a cooling circuit intended to cool the fuel cells and the functional elements, such that, in operation, a heat-transfer fluid circulates in the cooling circuit in a predefined direction, the cooling circuit being a closed circuit having at least one main segment, the flow of the heat-transfer fluid circulating entirely in the at least one main segment,
wherein the cooling circuit also has:
at least one secondary segment that corresponds to each fuel cell and is arranged so as to cool said fuel cell,
at least one secondary segment that corresponds to the functional elements and is arranged so as to cool said functional elements, and
at least one tertiary segment that corresponds to each heat exchanger for exchanging heat with ram air, and
a control unit in the form of electronic circuitry,
and wherein each secondary segment and each tertiary segment has:
a leak detection device,
a shut-off valve, the shut-off valve being situated at the inlet of the secondary or tertiary segment relative to the predefined direction of flow, and
a non-return valve intended to prevent reflux of the heat-transfer fluid through the secondary or tertiary segment in an opposite direction to the predefined direction of flow, the non-return valve being situated at the outlet of the secondary or tertiary segment, relative to the predefined direction of flow,
and wherein the control unit is configured to trigger the closure of the shut-off valve of one said secondary or tertiary segment when a leak is detected by the leak detection device of said secondary or tertiary segment, so as to stop the circulation of the heat-transfer fluid through said secondary or tertiary segment, in order to maintain the operation of the fuel cells or of the functional elements that are cooled by the cooling circuit and are situated on other segments of the cooling circuit than the secondary or tertiary segment on which the leak has been detected.

Thus, it is possible to isolate a secondary segment when a leak is detected in said secondary segment, in order to maintain the operation and the efficiency of the functional elements that are cooled by the cooling circuit and are situated on other segments of the cooling circuit than the secondary segment on which the leak has been detected. It is thus possible to protect the functionalities provided by said elements in the event of a leak, without significantly increasing the mass of the cooling circuit and therefore with the performance of the propulsion system of the aircraft being preserved.

According to one particular embodiment, the leak detection device has a drainage pipe designed to collect at least a part of the heat-transfer fluid flowing out of the secondary segment in the event of a leak, and also has a humidity sensor situated in the drainage pipe.

According to one particular embodiment, the leak detection device is an acoustic sensor associated with the electronic circuitry, said electronic circuitry having means for determining, by comparing a signal picked up by the acoustic sensor with acoustic signatures of leaks stored in memory, whether said signal is representative of a leak.

According to one embodiment, at least one secondary segment of the cooling circuit also has at least one heat exchanger, said heat exchanger being intended to cool one of the functional elements or a fluid used by one of the functional elements.

An aircraft having such a propulsion system, in any one of its embodiments, is also proposed.

A method for protecting a propulsion system of an aircraft is also proposed, the propulsion system comprising:

at least two fuel cells, an electric propulsion motor electrically connected to the fuel cells, functional elements, at least two heat exchangers provided to effect heat exchange with ram air, and a cooling circuit intended to cool the fuel cells and the functional elements, such that, in operation, a heat-transfer fluid circulates in the cooling circuit in a predefined direction, the cooling circuit being a closed circuit having at least one main segment, the flow of the heat-transfer fluid circulating entirely in the at least one main segment, the cooling circuit also having:

at least one secondary segment that corresponds to each fuel cell and is arranged so as to cool said fuel cell, at least one secondary segment that corresponds to the functional elements and is arranged so as to cool said functional elements, and at least one tertiary segment that corresponds to each heat exchanger for exchanging heat with ram air, and a control unit in the form of electronic circuitry, each secondary segment and each tertiary segment having:

a leak detection device, a shut-off valve, the shut-off valve being situated at the inlet of the secondary or tertiary segment relative to the predefined direction of flow, and a non-return valve intended to prevent reflux of the heat-transfer fluid through the secondary or tertiary segment in an opposite direction to the predefined direction of flow, the non-return valve being situated at the outlet of the secondary or tertiary segment, relative to the predefined direction of flow.

The method has the following steps:

detecting, for each secondary or tertiary segment, whether there is a leak of heat-transfer fluid, stopping the circulation of the heat-transfer fluid through one said secondary or tertiary segment when a leak of heat-transfer fluid is detected in said secondary or tertiary segment, preventing reflux of the heat-transfer fluid through said secondary or tertiary segment in an opposite direction to the predefined direction of flow in order to maintain the operation of the fuel cells or of the functional elements that are cooled by the cooling circuit and are situated on other segments of the cooling circuit than the secondary or tertiary segment on which the leak has been detected.

According to one particular embodiment, the step of stopping the circulation of the heat-transfer fluid through the secondary segment involves stopping the flow of the heat-transfer fluid at a location situated at the inlet of the secondary segment relative to the predefined direction of flow.

According to one particular embodiment, the step of preventing the reflux of the heat-transfer fluid through the secondary segment involves stopping the flow of the heat-transfer fluid in an opposite direction to the predefined direction of flow, at a location situated at the outlet of the secondary segment relative to the predefined direction of flow.

Also proposed is a computer program product that can be stored on a medium and/or downloaded from a communications network in order to be read by a processor. This computer program comprises instructions for implementing the abovementioned method in any one of its embodiments when said computer program is executed by the processor. The invention also relates to an information storage medium storing such a computer program comprising instructions for implementing the abovementioned method in any one of its embodiments when said computer program is read from said storage medium and executed by the processor.

BRIEF DESCRIPTION OF THE DRAWINGS

The features of the invention mentioned above, along with others, will become more clearly apparent on reading the following description of at least one exemplary embodiment, said description being given with reference to the appended drawings, in which.

DETAILED DESCRIPTION OF THE PREFERRED EMBODIMENTS

Figure 1:
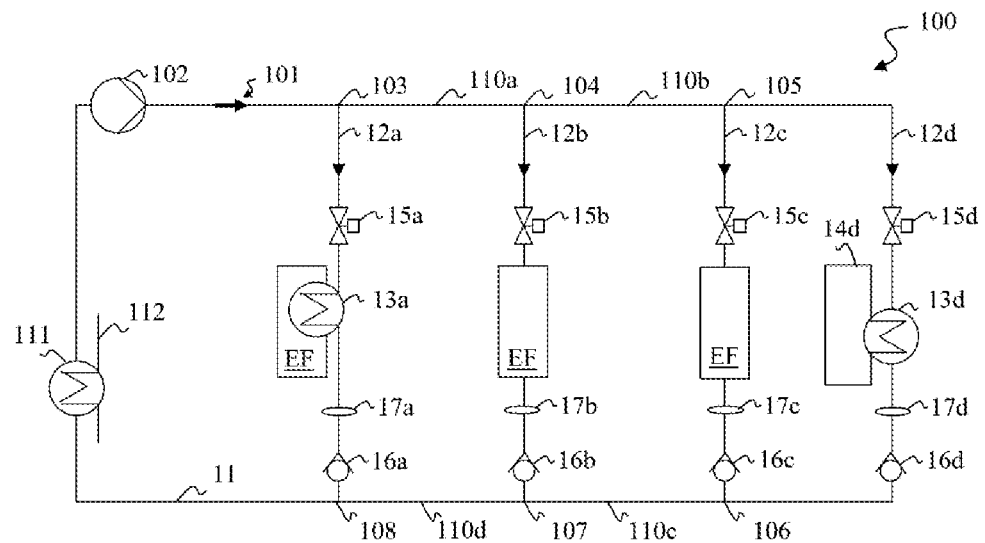
FIG. 1 schematically illustrates a cooling circuit of an aircraft according to a first particular embodiment of the present invention.

FIG. 1 thus schematically illustrates a cooling circuit 100 of an aircraft 1 according to one particular embodiment.

The cooling circuit 100 has a heat-transfer fluid circulating, in a closed circuit, in a pipe, along a predefined direction of flow 101. The predefined direction of flow 101 is defined by means for setting said heat-transfer fluid in circulation in the cooling circuit, such as a pump 102. According to one embodiment, the heat-transfer fluid is glycol water.

The cooling circuit 100 has at least one main segment 11 and has at least two secondary segments 12a, 12b, 12c, 12d. The entirety of the flow of heat-transfer fluid circulates through the at least one main segment 11. Moreover, the flow of the heat-transfer fluid which circulates in the main segment 11 is distributed into the different secondary segments 12a, 12b, 12c, 12d. In other words, the main segment 11 makes it possible to supply the secondary segments 12a, 12b, 12c, 12d in parallel with heat-transfer fluid.

For example, according to the embodiment shown in FIG. 1, the entirety of the flow of heat-transfer fluid circulating in the main segment 11 is distributed, at a first junction 103, in a first fraction circulating through the secondary segment 12a and an initial intermediate fraction circulating in an intermediate segment 110a in order to be distributed into the secondary segments 12b, 12c and 12d. The initial intermediate fraction of the flow of heat-transfer fluid is thus distributed, at a second junction 104, between a second fraction circulating in the secondary segment 12b and a secondary intermediate fraction circulating in an intermediate segment 110b. Lastly, the secondary intermediate fraction of the flow of heat-transfer fluid is distributed, at a third junction 105, between a third fraction circulating in the secondary segment 12c and a fourth fraction circulating in the secondary segment 12d. Said first, second, third and fourth fractions of the flow of heat-transfer fluid meet, at the outlet of the secondary segments 12a, 12b, 12c, 12d, at a junction 106 for the fourth and the third fractions, which themselves meet, via an intermediate segment 110c, the second fraction at a junction 107, and in turn meet, via an intermediate segment 110d, the first fraction at a junction 108.

According to an alternative embodiment (not shown), the entirety of the flow of heat-transfer fluid circulating in the main segment 11 is distributed at a single inlet junction between a first fraction circulating in a first secondary segment, a second fraction circulating in a second secondary segment, a third fraction circulating in a third secondary segment and a fourth fraction circulating in a fourth secondary segment. At the outlet of the secondary segments, said fractions of flow of the heat-transfer fluid can also meet in the main duct 11 at a single outlet junction.

The cooling circuit 100 is intended to cool functional elements EF of the aircraft 1. To this end, each secondary segment 12a, 12b, 12c, 12d is arranged so as to cool at least one functional element EF of the aircraft 1. The cooling can be achieved through thermal conduction, through the wall of the pipe of the secondary segment 12a, 12b, 12c, 12d, between the heat-transfer fluid and the functional element EF. Alternatively, the secondary segment (for example 12a) has a heat exchanger 13a for carrying out heat exchange between the heat-transfer fluid and the functional element EF. According to another alternative, the secondary segment 12d has a heat exchanger 13d for carrying out heat exchange between the heat-transfer fluid and another fluid circulating in a pipe 14d. The other fluid may thus itself be cooled (for example oil used in an engine) and be transported in order to cool a functional element EF of the aircraft 1.

Each secondary segment 12a, 12b, 12c, 12d also has a shut-off valve 15a, 15b, 15c, 15d situated at the inlet of the secondary segment 12a, 12b, 12c, 12d relative to the predefined direction of flow 101, in other words between the inlet of said secondary segment 12a, 12b, 12c, 12d and the at least one functional element EF or the heat exchanger 13a, 13d situated on said secondary segment.

The inlet of the secondary segment is situated at the junction between the main segment 11 and said secondary segment 12a, 12b, 12c, 12d, on the side at which the heat-transfer fluid enters the secondary segment with respect to the predefined direction of flow 101. Alternatively, when the heat-transfer fluid circulates in an intermediate segment 110a, 110b before entering the secondary segment 12a, 12b, 12c, 12d, the inlet of the secondary segment in question is situated at the junction between the last intermediate segment 110a, 110b through which the heat-transfer fluid circulates before entering the secondary segment 12a, 12b, 12c, 12d and said secondary segment 12a, 12b, 12c, 12d. For example, the inlet of the secondary segment 12a is situated at the junction 103, the inlet of the secondary segment 12b is situated at the junction 104, the inlets of the secondary segments 12c and 12d are situated at the junction 105.

In other words, the inlet of the secondary segment 12a, 12b, 12c, 12d is situated, on the side at which the heat-transfer fluid enters the secondary segment with respect to the predefined direction of flow 101, at the junction between said secondary segment and a prior segment of the cooling circuit which is closest to said secondary segment and through which there passes a fraction of the flow of heat-transfer fluid larger than the fraction of heat-transfer fluid circulating in said secondary segment and comprising said fraction of heat-transfer fluid circulating in said secondary segment, said prior segment of the cooling circuit being able to be the main segment 11 or an intermediate segment 110a, 110b.

Each shut-off valve 15a, 15b, 15c, 15d thus makes it possible to stop the circulation of the heat-transfer fluid through the secondary segment in question 12a, 12b, 12c, 12d when said shut-off valve 15a, 15b, 15c, 15d is triggered, while maintaining the circulation of the heat-transfer fluid in the other secondary segments 12a, 12b, 12c, 12d. When the shut-off valve 15a, 15b, 15c, 15d is not triggered, in other words when the shut-off valve is in an inactive state, the heat-transfer fluid circulates normally through said shut-off valve 15a, 15b, 15c, 15d and therefore through the respective secondary segment 12a, 12b, 12c, 12d.

Each secondary segment 12a, 12b, 12c, 12d also has a non-return valve 16a, 16b, 16c, 16d. Each non-return valve 16a, 16b, 16c, 16d is intended to prevent reflux of the heat-transfer fluid through the secondary segment in question 12a, 12b, 12c, 12d, in other words is intended to prevent the heat-transfer fluid from circulating in an opposite direction to the predefined direction of flow 101 in said secondary segment 12a, 12b, 12c, 12d.

Each non-return valve 16a, 16b, 16c, 16d is situated at the outlet of said secondary segment 12a, 12b, 12c, 12d relative to the predefined direction of flow 101. In other words, each non-return valve 16a, 16b, 16c, 16d is situated between the functional element EF or the heat exchanger 13a, 13d situated on the secondary segment and the outlet of said secondary segment 12a, 12b, 12c, 12d.

The outlet of the secondary segment is situated at the junction between the main segment 11 and said secondary segment 12a, 12b, 12c, 12d, on the side at which the heat-transfer fluid exits the secondary segment with respect to the predefined direction of flow 101. Alternatively, when the heat-transfer fluid circulates, on exiting the secondary segment 12a, 12b, 12c, 12d, in an intermediate segment before meeting the main segment 11 from the secondary segment 12a, 12b, 12c, 12d, the outlet of said secondary segment is situated at the junction between said secondary segment 12a, 12b, 12c, 12d and the first intermediate segment through the heat-transfer fluid circulates before meeting the main segment 11. For example, the outlet of the secondary segment 12a is situated at the junction 108, the outlet of the secondary segment 12b is situated at the junction 107, the outlets of the secondary segments 12c and 12d are situated at the junction 106.

In other words, the outlet of the secondary segment 12a, 12b, 12c, 12d is situated, on the side at which the heat-transfer fluid exits the secondary segment with respect to the predefined direction of flow 101, at the junction between said secondary segment and a subsequent segment of the cooling circuit which is closest to said secondary segment and through which there passes a fraction of the flow of heat-transfer fluid larger than the fraction of heat-transfer fluid circulating in said secondary segment and comprising said fraction of heat-transfer fluid circulating in said secondary segment, said subsequent segment of the cooling circuit being able to be the main segment 11 or an intermediate segment.

Thus, when the shut-off valve of a secondary segment (for example 12b) is triggered, the pressure of the heat-transfer fluid in the other secondary segments (12a, 12c, 12d) puts the corresponding non-return valve (16b) into a closed position, and thus prevents reflux of the heat-transfer fluid into the secondary segment in question (12b) in an opposite direction to the predefined direction of flow 101.

Each secondary segment 12a, 12b, 12c, 12d also has a leak detector 17a, 17b, 17c, 17d for detecting whether there is a leak on said secondary segment 12a, 12b, 12c, 12d, that is to say whether a part of the flow of heat-transfer fluid is flowing out of the pipe forming the secondary segment 12a, 12b, 12c, 12d, in a zone situated between the shut-off valve 15a, 15b, 15c, 15d and the non-return valve 16a, 16b, 16c, 16d. The leak detector 17a, 17b, 17c, 17d is designed to detect a potential leak of heat-transfer fluid between the shut-off valve 15a, 15b, 15c, 15d and the non-return valve 16a, 16b, 16c, 16d in the corresponding secondary segment 12a, 12b, 12c, 12d. The leak detector 17a, 17b, 17c, 17d is for example an acoustic sensor, such as a Bragg grating in an optical fiber, making it possible to detect acoustic signatures of leaks of liquid in a pipe. Electronic circuitry, associated with the acoustic sensor, has a copy of said acoustic signatures of leaks and also has means for comparing a signal picked up by the acoustic sensor with acoustic signatures of leaks stored in memory. Said electronic circuitry associated with the acoustic sensor thus makes it possible to determine with a signal picked up by the acoustic sensor is representative of a leak. Alternatively, the electronic circuitry implements a signal processing algorithm in order to use mathematical analysis of a signal picked up by the acoustic sensor to identify the presence of a signature representative of a leak.

According to another example, the leak detector 17a, 17b, 17c, 17d is a humidity sensor positioned in a drainage pipe dedicated to leak detection and associated with the secondary segment 12a, 12b, 12c, 12d in question. The drainage pipe is for example installed around the pipe of the secondary segment 12a, 12b, 12c, 12d such that, in the event of a leak of heat-transfer fluid out of the pipe of the secondary segment 12a, 12b, 12c, 12d, a part of the heat-transfer fluid is located in the drainage pipe. The humidity sensor thus detects the presence of heat-transfer fluid in the drainage pipe and transmits information representative of a leak in the secondary segment 12a, 12b, 12c, 12d in question. The humidity sensor may for example be an optical fiber sensor, a float valve or a reflection sensor.

The cooling circuit also has a control unit 400 (not shown in FIG. 1), or alternatively a set of control units 400, capable of receiving, from each leak detector 17a, 17b, 17c, 17d, information representative of the presence of a leak on the respective secondary segments 12a, 12b, 12c, 12d. The control unit 400, or alternatively the set of control units 400, is also capable of transmitting instructions to each shut-off valve 15a, 15b, 15c, 15d in order to trigger said shut-off valve 15a, 15b, 15c, 15d when information representative of the presence of a leak is detected on the secondary segment 12a, 12b, 12c, 12d on which the shut-off valve 15a, 15b, 15c, 15d is located.

Thus, when a leak of heat-transfer fluid is detected in a secondary segment 12a, 12b, 12c, 12d, the circulation of the heat-transfer fluid through the secondary segment 12a, 12b, 12c, 12d is stopped by the triggering of the associated shut-off valve 15a, 15b, 15c, 15d.

The cooling circuit 100 also has a heat exchanger of a second type 111 intended to allow heat exchange of a second type between the heat-transfer fluid and another fluid, referred to as cooling fluid, circulating in a pipe 112. Said heat exchange of the second type brings about a transfer of heat from the heat-transfer fluid to the cooling fluid, thereby making it possible to cool the heat-transfer fluid which has been heated by the different heat exchanges of the first type. According to one particular embodiment, the heat exchanger of the second type 111 is a ram air exchanger, the cooling fluid then being ram air. The quantity of ram air sent into the heat exchanger 111 of the second type can be controlled in order to make it possible to control the temperature of the heat-transfer fluid exiting the heat exchanger 111 and thus to control the temperature of the functional elements EF of the aircraft 1.

The functional elements EF of the aircraft 1 that are cooled by the cooling circuit 100 may be fuel cells or on-board systems, including: current converters of the DC-DC type, dihydrogen recirculation pumps, power electric distribution boxes, a turbine engine air compression, a control unit of a propulsion engine, or a control unit of a heat-transfer fluid pump motor.

According to one particular embodiment, the cooling circuit 100 is intended to cool at least two fuel cells 21a, 21b, 21c. Each fuel cell 21a, 21b, 21c is situated on a separated secondary segment 12a, 12b, 12c.

Figure 2:
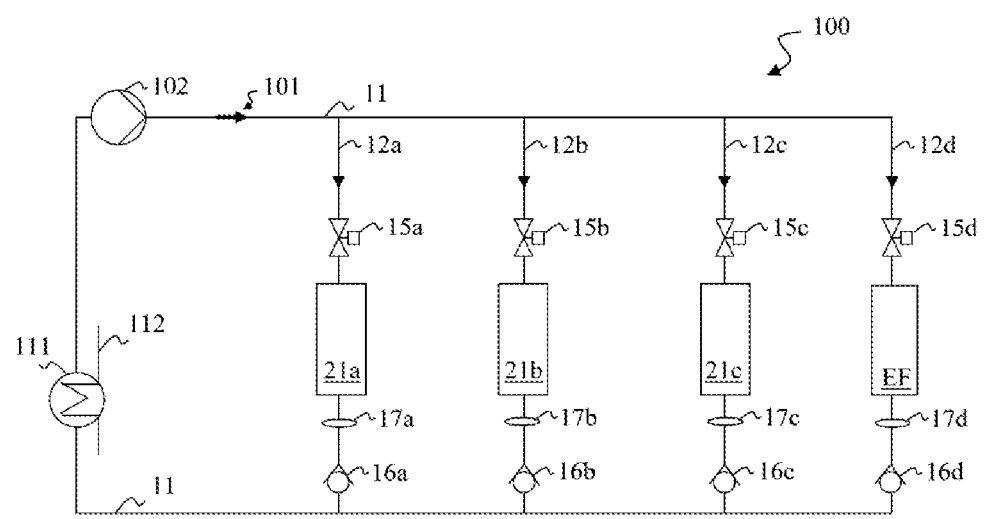
FIG. 2 schematically illustrates a cooling circuit of the aircraft according to a second embodiment of the invention.

For example, as illustrated in FIG. 2, the secondary segment 12a is arranged so as to cool a first fuel cell 21a. According to one exemplary embodiment, the fuel cell 21a has integrated cooling paths which are passed through by the heat-transfer fluid circulating in the secondary segment 12a. The cooling paths act like a heat exchanger, thereby allowing a transfer of heat from the fuel cell to the heat-transfer fluid and thus making it possible to cool the fuel cell 21a.

Parallel to the secondary segment 12a, the secondary segment 12b is arranged so as to cool a second fuel cell 21b.

Parallel to the secondary segments 12a and 12b, the secondary segment 12c is arranged so as to cool a third fuel cell 21c.

The secondary segment 12d can be used to cool another functional element EF of the aircraft 1 such as those cited in FIG. 1.

In other words, each of the separate secondary segments, 12a, 12b and 12c, respectively, is intended to cool a separate fuel cell, 21a, 21b and 21c, respectively.

When a leak arises on one of the secondary segments 12a, 12b or 12c, for example on the secondary segment 12a, the detection of the leak by the leak detector 17a causes the triggering of the shut-off valve 15a, thereby stopping the circulation of the heat-transfer fluid in said secondary segment 12a. Therefore, the fuel cell 21a can no longer be cooled, this causing a drop in efficiency and possibly requiring the stopping of the fuel cell 21a, but the other fuel cells 21b, 21c can continue to operate without a loss of power. Thus, it is possible to preserve a minimum power of the thrust of the aircraft 1 even in the event of a leak of heat-transfer fluid in the cooling circuit 100. In addition, the operation of any other functional element EF of the aircraft 1 that is cooled by the secondary segment 12d is maintained. Moreover, the preservation of the minimum thrust power and the maintenance of the functionalities provided by the on-board systems are obtained without a significant increase in the mass of the cooling circuit, making it possible to maintain the performance of the aircraft 1 and limiting the increase in drag of the aircraft 1.

Figure 3:
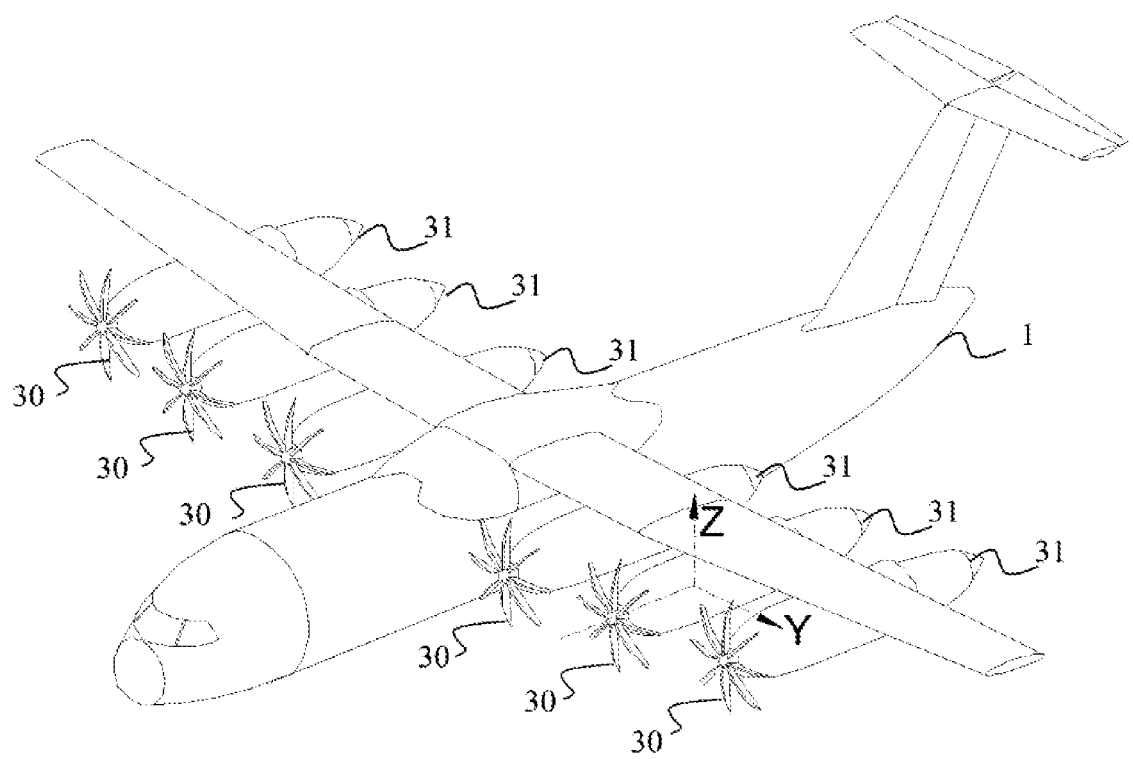
FIG. 3 schematically illustrates an aircraft having a cooling circuit according to one or more embodiments of the present invention.

FIG. 3 schematically illustrates the aircraft 1 having the cooling circuit 100. The aircraft 1 has electric propulsion motors 30 which are supplied with electricity by fuel cells 21a, 21b, 21c that function with dihydrogen. According to one particular embodiment, the aircraft 1 has autonomous propeller-type systems 31 (or "pods"), each of said autonomous propeller-type systems 31 having at least two fuel cells 21a, 21b, 21c and having a propulsion motor 30 electrically connected to the fuel cells 21a, 21b, 21c.

Figure 4:
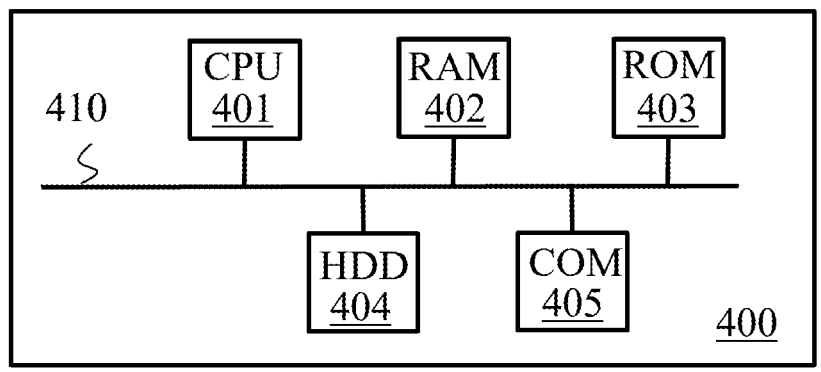
FIG. 4 schematically illustrates an example of a hardware architecture of a control unit of the cooling circuit.

FIG. 4 schematically illustrates an example of the hardware architecture of the control unit 400 of the cooling circuit 100. The control unit 400 then has, connected by a communication bus 410: a processor or CPU ("central processing unit") 401; a random access memory (RAM) 402; a read-only memory (ROM) 403; a storage unit or a storage medium reader, such as a hard disk drive 404; and an interface 405 which makes it possible to communicate with the leak detectors 17a, 17b, 17c, 17d and with the shut-off valves 15a, 15b, 15c, 15d.

The processor 401 is capable of executing instructions loaded into the RAM 402 from the ROM 403, from an external memory (not shown), from a storage medium, or from a communication network. When the control unit 400 is powered up, the processor 401 is capable of reading instructions from the RAM 402 and of executing them. These instructions form a computer program that causes the processor 401 to implement all or some of the algorithms and steps described below in relation to the control unit 400.

Thus, all or some of the algorithms and steps described below in relation to the control unit 400 may be implemented in software form through the execution of a set of instructions by a programmable machine such as a DSP (digital signal processor) or a microcontroller, or may be implemented in hardware form by a machine or a dedicated component such as an FPGA (field-programmable gate array) or ASIC (application-specific integrated circuit).

Figure 5:
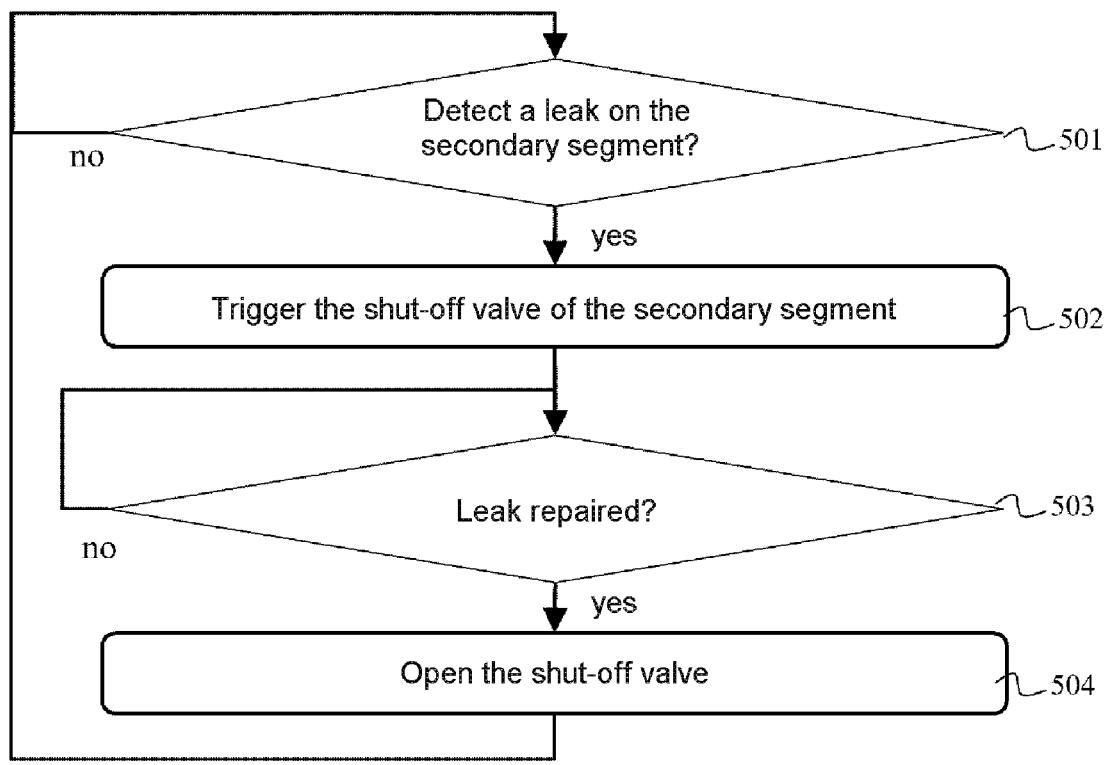
FIG. 5 schematically illustrates steps in a method for protecting the cooling circuit of the aircraft.

FIG. 5 schematically illustrates steps in a method for protecting the cooling circuit 100 of the aircraft 1. Said steps form an algorithm implemented by the control unit 400 of the cooling circuit 100, and independently for each secondary segment 12a, 12b, 12c, 12d.

In a first step 501, the control unit 400 determines whether a leak has been detected by the leak detector 17a, 17b, 17c, 17d of the secondary segment 12a, 12b, 12c, 12d in question. If this is the case, a step 502 is carried out. Otherwise, the control unit 400 returns to step 501.

In step 502, the control unit 400 triggers the shut-off valve 15a, 15b, 15c, 15d of the secondary segment 12a, 12b, 12c, 12d on which the leak was detected in the preceding step 501.

In a following step 503, the control unit 400 detects whether a maintenance operation has been carried out and whether the leak has been repaired. For example, a maintenance operator may, after having carried out a maintenance operation, send to the control unit 400 information representative of the repairing of the leak by pressing a dedicated button. If the leak has been repaired, a step 504 is carried out. Otherwise, the control unit 400 repeats step 503.

In step 504, the shut-off valve 15a, 15b, 15c, 15d that was triggered in step 502 is opened so as to allow the heat-transfer fluid to pass through the secondary segment 12a, 12b, 12c, 12d in question again. Alternatively, the control unit 400 is reinitialized or reconfigured so as to deactivate the shut-off valve 15a, 15b, 15c, 15d and go into standby for detection of a leak on the secondary segment 12a, 12b, 12c, 12d in question.

The control unit 400 then returns to the initial step 501.

Figure 6:
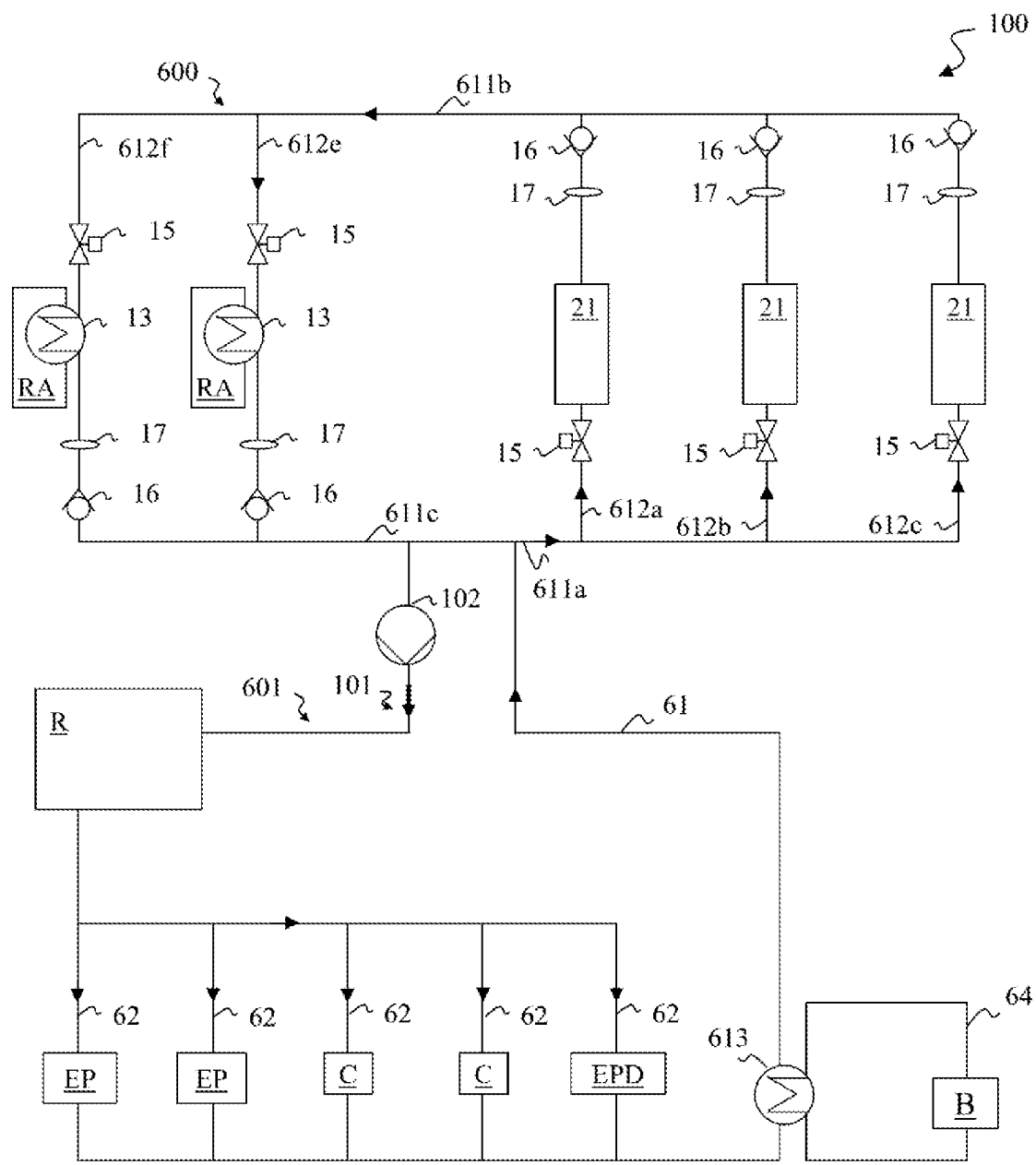
FIG. 6 schematically illustrates a cooling circuit according to a third particular embodiment.

FIG. 6 schematically illustrates the cooling circuit 100 according to a third particular embodiment.

The cooling circuit 100 then has, connected together in a closed circuit, a main circuit 600 and a secondary circuit 601. The main circuit 600 has a plurality of main segment portions 611a, 611b, 611c, three secondary segments 612a, 612b, 612c, and two tertiary segments 612e and 612f. On entering the main circuit 600, in the predefined direction of flow 101, the heat-transfer fluid passes into a first main segment portion 611a, is distributed in parallel in the secondary segments 612a, 612b and 612c, passes back into a second secondary segment portion 611b, is distributed in parallel in the tertiary segments 612e and 612f and returns into a third main segment portion 611c. On exiting the third main segment portion 611c, the heat-transfer fluid is sent back to the first main segment portion 611a and/or sent to the secondary circuit 601.

Each secondary segment 612a, 612b, 612c and tertiary segment 612e, 612f of the main circuit 600 has a shut-off valve 15, situated at the inlet of one said secondary segment 612a, 612b, 612c or tertiary segment 612e, 612f relative to the predefined direction of flow 101, has a non-return valve 16, situated at the outlet of said secondary segment 612a, 612b, 612c or tertiary segment 612e, 612f relative to the predefined direction of flow 101, and also has a leak detection device 17, situated between the shut-off valve 15 and the non-return valve 16 of said secondary segment 612a, 612b, 612c or tertiary segment 612e, 612f.

Each of the secondary segments 612a, 612b, 612c is arranged so as to cool a separate fuel cell 21, situated on the secondary segment 12a, 12b, 12c in question. Each of the tertiary segments 612e, 612f is arranged so as to allow the heat-transfer fluid to be heated. Thus, the tertiary segments 612e, 612f each have a heat exchanger 13 that effects heat exchange of the second type with ram air (RA) of the aircraft 1 and thus makes it possible to transfer heat from the ram air (RA) to the heat-transfer fluid.

The cooling circuit 100 also has a control unit 400 (not shown in FIG. 6), or alternatively a set of control units 400, in the form of electronic circuitry, capable, for each secondary segment 612a, 612b, 612c or tertiary segment 612e, 612f, of receiving, from the leak detector 17 of said secondary segment 612a, 612b, 612c or tertiary segment 612e, 612f, information representative of the presence of a leak on said secondary segment 612a, 612b, 612c or tertiary segment 612e, 612f. The control unit 400, or alternatively the set of control units 400, is capable, for one said secondary segment 612a, 612b, 612c or tertiary segment 612e, 612f, of transmitting instructions to the shut-off valve 15 of said secondary segment 612a, 612b, 612c or tertiary segment 612e, 612f in order to trigger said shut-off valve 15 when information representative of the presence of a leak is detected on said secondary segment 612a, 612b, 612c or tertiary segment 612e, 612f.

The secondary circuit 601 has a main segment 61 on which there are located a pump 102 driving the circulation of the heat-transfer fluid in the predefined direction of flow 101 and a reservoir R of heat-transfer fluid. The secondary circuit 601 also has at least two secondary segments 62 in which the heat-transfer fluid is distributed in parallel. Each of said secondary segments 62 is arranged so as to cool a functional element of the aircraft 1. For example, two first secondary segments 62 are arranged so as each to cool a propulsion unit EP comprising at least one control unit for a motor and an electric motor. Two second secondary segments 62 are arranged so as to each to cool a DC-DC converter C. A third secondary segment 62 is arranged so as to cool a power electric distribution box EPD.

The secondary circuit 601 has, on the main segment 61, a heat exchanger 613 that effects heat exchange between the heat-transfer fluid and the oil circulating in a pipe 64 so as to cool the oil. The oil is used for example as a lubricant in a gearbox B.

Figure 7:
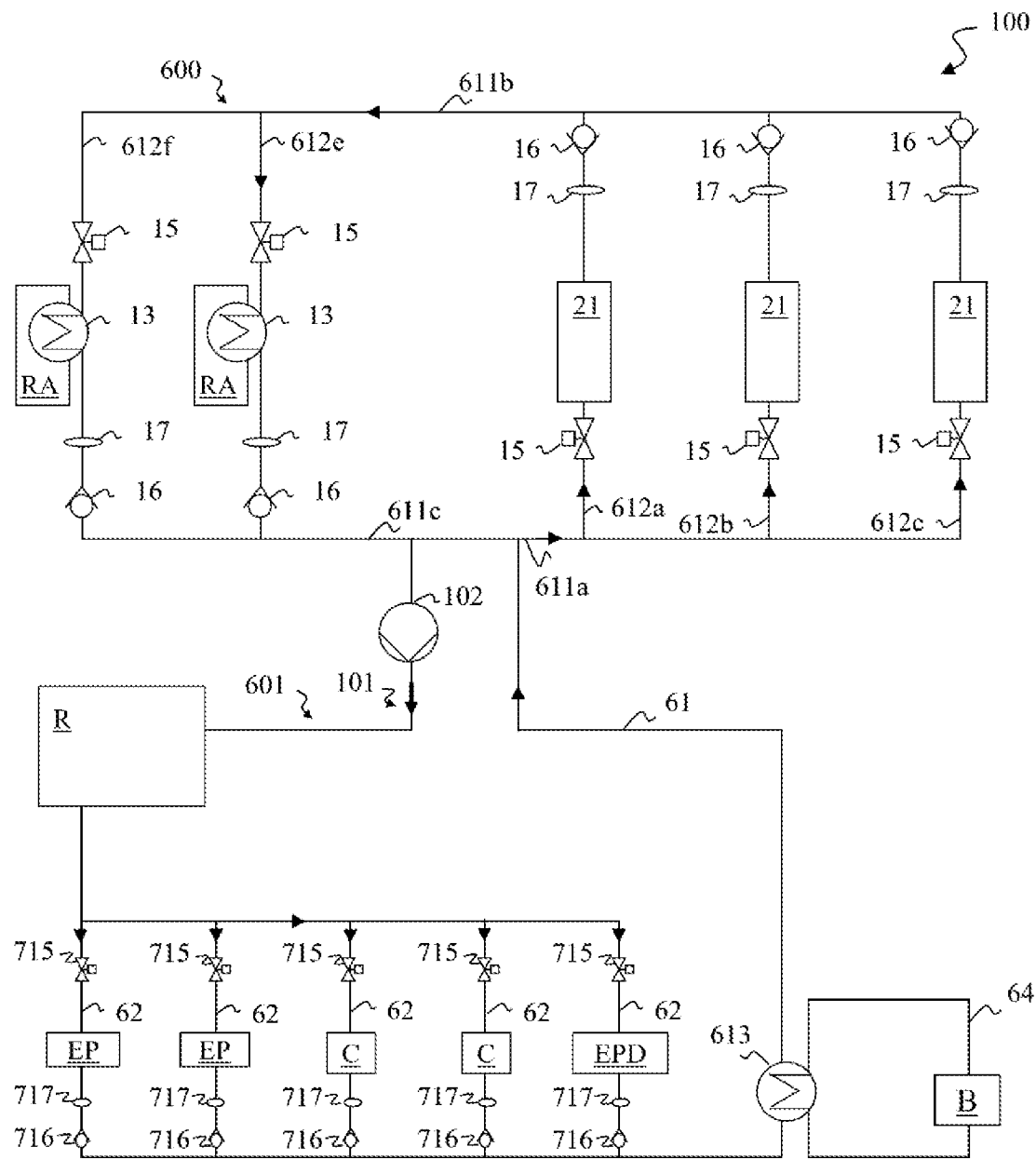
FIG. 7 schematically illustrates a cooling circuit according to a fourth particular embodiment.

FIG. 7 schematically illustrates the cooling circuit 100 according to a fourth particular embodiment. The cooling circuit 100 according to the fourth particular embodiment has the elements of the cooling circuit 100 according to the third particular embodiment and also has, on each secondary segment 62 of the secondary circuit 601, a shut-off valve 715, a non-return valve 716 and a leak detection device 717. For each secondary segment 62, the shut-off valve 715 is positioned at the inlet of the secondary segment 62, relative to the predefined direction of flow 101, the non-return valve 716 is situated at the outlet of the secondary segment 62, relative to the predefined direction of flow 101, and the leak detection device 717 is situated, on the secondary segment 62, between the shut-off valve 715 and the non-return valve 716.

The cooling circuit 100 also has a control unit 400 (not shown in FIG. 7), or alternatively a set of control units 400, in the form of electronic circuitry, capable, for each secondary segment 62, of receiving, from the leak detector 717 of said secondary segment 62, information representative of the presence of a leak on said secondary segment 62, and of transmitting instructions to the shut-off valve 715 of said secondary segment 62 in order to trigger said shut-off valve 715 when information representative of the presence of a leak is detected on said secondary segment 62.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, the propulsion system comprising:
    at least two fuel cells,
    an electric propulsion motor electrically connected to the at least two fuel cells,
    at least two functional elements (EF),
    at least two heat exchangers configured to permit heat exchange with ram air (RA), and
    a cooling circuit configured to cool the at least two fuel cells and the at least two functional elements, such that, in operation, a heat-transfer fluid circulates in the cooling circuit in a predefined direction of flow, the cooling circuit being a closed circuit having at least one main segment, the flow of the heat-transfer fluid circulating entirely in the at least one main segment,
    wherein the cooling circuit further comprises:
        a primary circuit having:
            at least one first main segment,
            at least one first secondary segment that corresponds to each fuel cell and configured to cool each said fuel cell, and
            at least one tertiary segment that corresponds to each heat exchanger for exchanging heat with ram air (RA),
        a secondary circuit having:
            at least one second main segment,
            at least one second secondary segment that corresponds to each functional element and configured so as to cool each said functional element,
            a pump located on the at least one second main segment, and
            a reservoir containing heat-transfer fluid, and
        a control unit comprising electronic circuitry,
        wherein each first secondary segment and each tertiary segment has:
            a leak detection device,
            a shut-off valve, the shut-off valve at an inlet of the first secondary or tertiary segment relative to the predefined direction of flow, and a non-return valve configured to prevent reflux of the heat-transfer fluid through the first secondary or tertiary segment in an opposite direction to the predefined direction of flow, the non-return valve at an outlet of the first secondary or tertiary segment, relative to the predefined direction of flow, and wherein the control unit is configured to trigger a closure of the shut-off valve of a first secondary segment or a tertiary segment when a leak is detected by the leak detection device of said first secondary segment or said tertiary segment, so as to stop the circulation of the heat-transfer fluid through said first secondary segment or said tertiary segment, in order to maintain the operation of the at least two fuel cells or of the at least two functional elements that are cooled by the cooling circuit and are situated on other segments of the cooling circuit than said first secondary segment or said tertiary segment on which the leak has been detected.

2. The propulsion system according to claim 1, wherein the leak detection device is an acoustic sensor associated with the electronic circuitry, said electronic circuitry configured to determine, by comparing a signal picked up by the acoustic sensor with acoustic signatures of leaks stored in memory, whether said signal is representative of a leak.

3. The propulsion system according to claim 1, wherein the leak detection device further comprises:
a drainage pipe designed to collect, in a leak, at least a part of the heat-transfer fluid flowing out of the first secondary segment; and
a humidity sensor situated in the drainage pipe.

4. The propulsion system according to claim 1, wherein the at least one second main segment further comprises at least one heat exchanger, said heat exchanger being configured to cool a functional element (EF) or a fluid used by a functional element (EF).

5. An aircraft comprising:
the propulsion system according to claim 1.

6. The propulsion system according to claim 1, wherein each second secondary segment has:
a leak detection device,
a shut-off valve, the shut-off valve at an inlet of the second secondary segment relative to the predefined direction of flow, and
a non-return valve configured to prevent reflux of the heat-transfer fluid through the second secondary segment in an opposite direction to the predefined direction of flow, the non-return valve at an outlet of the second secondary segment, relative to the predefined direction of flow.

7. The propulsion system according to claim 6, wherein the control unit is configured to trigger a closure of the shut-off valve of a second secondary segment when a leak is detected by the leak detection device of said second secondary segment, so as to stop the circulation of the heat-transfer fluid through said second secondary segment, in order to maintain the operation of the of the at least two fuel cells or of the at least two functional elements that are cooled by the cooling circuit and are situated on other segments of the cooling circuit than said second secondary segment on which the leak has been detected.

8. A method for protecting a propulsion system of an aircraft, the propulsion system comprising:
at least two fuel cells,
an electric propulsion motor electrically connected to the fuel cells,
at least two functional elements (EF),
at least two heat exchangers configured to allow heat exchange with ram air (RA), and
a cooling circuit configured to cool the at least two fuel cells and the at least two functional elements, such that, in operation, a heat-transfer fluid circulates in the cooling circuit in a predefined direction of flow, the cooling circuit being a closed circuit having at least one main segment, the flow of the heat-transfer fluid circulating entirely in the at least one main segment,
wherein the cooling circuit comprises:
a primary circuit having:
at least one first main segment,
at least one first secondary segment that corresponds to each fuel cell and configured to cool each said fuel cell, and
at least one tertiary segment that corresponds to each heat exchanger for exchanging heat with ram air (RA),
a secondary circuit having:
at least one second main segment,
at least one second secondary segment that corresponds to each functional element and configured so as to cool each said functional element,
a pump located on the at least one second main segment, and
a reservoir containing heat-transfer fluid, and
a control unit comprising electronic circuitry,
wherein each first secondary segment and each tertiary segment comprises:
a leak detection device,
a shut-off valve, the shut-off valve being situated at an inlet of the first secondary or tertiary segment relative to the predefined direction of flow, and
a non-return valve configured to prevent reflux of the heat-transfer fluid through the first secondary or tertiary segment in an opposite direction to the predefined direction of flow, the non-return valve being situated at an outlet of the first secondary or tertiary segment, relative to the predefined direction of flow, and
the method comprising the following steps:
detecting, for each first secondary or tertiary segment, whether there is a leak of heat-transfer fluid,
stopping the circulation of the heat-transfer fluid through a first secondary or tertiary segment when a leak of heat-transfer fluid is detected in said first secondary or tertiary segment,
and preventing a reflux of the heat-transfer fluid through said first secondary or tertiary segment in an opposite direction to the predefined direction of flow in order to maintain the operation of the fuel cells or of the functional element that are cooled by the cooling circuit and are situated on other segments of the cooling circuit than the first secondary or tertiary segment on which the leak has been detected.

9. The method according to claim 8, wherein the step of stopping the circulation of the heat-transfer fluid through the first secondary or tertiary segment comprises stopping the flow of the heat-transfer fluid at a location situated at the inlet of the first secondary or tertiary segment relative to the predefined direction of flow.

10. The method according to claim 8, wherein the step of preventing the reflux of the heat-transfer fluid through the first secondary or tertiary segment comprises stopping the flow of the heat-transfer fluid in an opposite direction to the predefined direction of flow, at a location situated at the outlet of the first secondary or tertiary segment relative to the predefined direction of flow.

11. A non-transitory computer readable medium comprising:
- a computer program comprising instructions for implementing the method according to claim 8 when said computer program is read from said non-transitory computer readable medium and executed by the processor.

12. The method according to claim 8, wherein each second secondary segment has:
- a leak detection device,
- a shut-off valve, the shut-off valve at an inlet of the second secondary segment relative to the predefined direction of flow, and
- a non-return valve configured to prevent reflux of the heat-transfer fluid through the second secondary segment in an opposite direction to the predefined direction of flow, the non-return valve at an outlet of the second secondary segment, relative to the predefined direction of flow.

13. The method according to claim 12, wherein the control unit is configured to trigger a closure of the shut-off valve of a second secondary segment when a leak is detected by the leak detection device of said second secondary segment, so as to stop the circulation of the heat-transfer fluid through said second secondary segment, in order to maintain the operation of the of the at least two fuel cells or of the at least two functional elements that are cooled by the cooling circuit and are situated on other segments of the cooling circuit than said second secondary segment on which the leak has been detected.

* * * * *